US007561401B2

(12) United States Patent
Han

(10) Patent No.: US 7,561,401 B2
(45) Date of Patent: Jul. 14, 2009

(54) CIRCUIT PROTECTOR FOR ELECTRIC DEVICE

(75) Inventor: Liao Chen Han, Taichung (TW)

(73) Assignee: Kuo Han Electronic Co., Ltd., Taichung (TW)

( * ) Notice: Subject to any disclaimer, the term of this patent is extended or adjusted under 35 U.S.C. 154(b) by 103 days.

(21) Appl. No.: 11/737,032

(22) Filed: Apr. 18, 2007

(65) Prior Publication Data

US 2008/0259516 A1 Oct. 23, 2008

(51) Int. Cl.
*H02H 1/00* (2006.01)

(52) U.S. Cl. ...................................... 361/131; 261/120

(58) Field of Classification Search ................. 361/120, 361/131

See application file for complete search history.

(56) References Cited

U.S. PATENT DOCUMENTS 2,879,354 A * 3/1959 Fahnoe ....................... 337/164
3,641,358 A * 2/1972 Lian et al. ....................... 361/8
4,350,935 A * 9/1982 Spira et al. .................. 315/291
4,710,847 A * 12/1987 Kortschinski et al. ....... 361/125
4,907,120 A * 3/1990 Kaczmarek et al. ......... 361/119
2002/0021541 A1 * 2/2002 Kauffman ................... 361/119
2006/0238940 A1 * 10/2006 Komulainen et al. ....... 361/91.1
2007/0253136 A1 * 11/2007 Groth et al. ................. 361/127

* cited by examiner

*Primary Examiner*—Ronald W Leja
*Assistant Examiner*—Christopher J Clark
(74) *Attorney, Agent, or Firm*—Lowe Hauptman Ham & Berner, LLP

(57) ABSTRACT

A protector for an electric device comprises a driving device and a voltage stabilizing device serially connected to the voltage stabilizing device. After a switch of a power source is turned on, a current of high voltage flows into the voltage stabilizing device. Two conductive plates inside the voltage stabilizing device are electrically conducted and a current flows into the driving device. A spring plate having a semiconductor chip is then separated from an other spring plate and then returns back to contact together with the other spring plate. Meanwhile, the extra current of the power source is consumed such that the surge current instantly generated from power source is consumed, and damage to the electric device is prevented.

5 Claims, 2 Drawing Sheets

CIRCUIT PROTECTOR FOR ELECTRIC DEVICE

BACKGROUND OF THE INVENTION

1. Field of the Invention

The present invention relates to a protector for an instant driving circuit of an electric device, especially, to a circuit protector which can absorb surge current generated from turning on a power source at the time when an electric device is instantly driven, so as to prevent the electric device from been damaged.

2. Description of the Related Art

It is known to the public that a conventional driving circuit protector for an electric device, such as: a florescent lamp etc., uses a positive temperature coefficient (PTC) element. When a high voltage is supplied from the electric source to the circuit for driving the florescent lamp etc., the resistance of the PTC element would be increased, so as to reduce the electric current flowing into the driving circuit of the florescent lamp and thus prevent the extra generated surge current from damaging the florescent lamp and its driving circuit.

However, although the PTC element can reduce the electric current flowing into the florescent lamp, the resistance of the PTC element increases very slowly, and when the surge current generated from the power source instantly occurs, the surge current can not be instantly consumed and prevented from flowing into the driving circuit of the florescent lamp etc. Therefore, damages of the florescent lamp etc. or its driving circuit due to the instant surge current flowing into florescent lamp etc. and its driving circuit often happens.

Accordingly, the present invention has been made to solve the above-mentioned problems occurring in the prior art.

SUMMARY OF THE INVENTION

Consequently, a major object of present invention is to provide a protector for an instant driving circuit of an electric device, which is able to absorb and consume surge current generated from turning on power source at the time when an electric device is instantly driven, such that damage to the electric device is prevented.

According to the object of present invention, there is provided a protector for an instant driving circuit of an electric device comprising a driving device and a voltage stabilizing device, wherein, such driving device has a sealed tube installed with two spring plates normally contacting each other, wherein one spring plate is provided with a semiconductor chip on one side and is connected to an electric resistant wire, while the spring plates are connected respectively to the electric conductive wires outside the sealed tube. Said voltage stabilizing device also has a sealed tube filled with a gas and installed with two conductive plates opposite each other, and the two conductive plates are respectively connected to the electric conductive wires outside the sealed tube, and wherein, one electric conductive wire of said driving device is connected to that of the voltage stabilizing device, such that the driving device is serially connected to the voltage stabilizing device. When the protector is connected to a driving circuit of an electric device, after the switch of a power source is turned on, the current of high voltage of the power source then flows into the voltage stabilizing device, and the two conductive plates installed inside the voltage stabilizing device are electrically conducted due to the function of the gas filled in the sealed tube of the voltage stabilizing device. Then the current flows into the driving device, and the spring plate having the semiconductor chip is then instantly separated from the other spring plate and then contacted together, so as to trigger the electric device(s). Meanwhile, the extra current of the power source is consumed in the electric resistant wire. As a result, the surge current instantly generated from the power source is consumed, and damage to the electric device and/or its driving circuit due to the surge current is prevented.

BRIEF DESCRIPTION OF THE DRAWINGS

The above aspects, and other features and advantages of the present invention will become more apparent after a reading of the following detailed description when taken in conjunction with the drawings, in which.

DETAILED DESCRIPTION OF PREFERRED EMBODIMENTS

Figure 1:
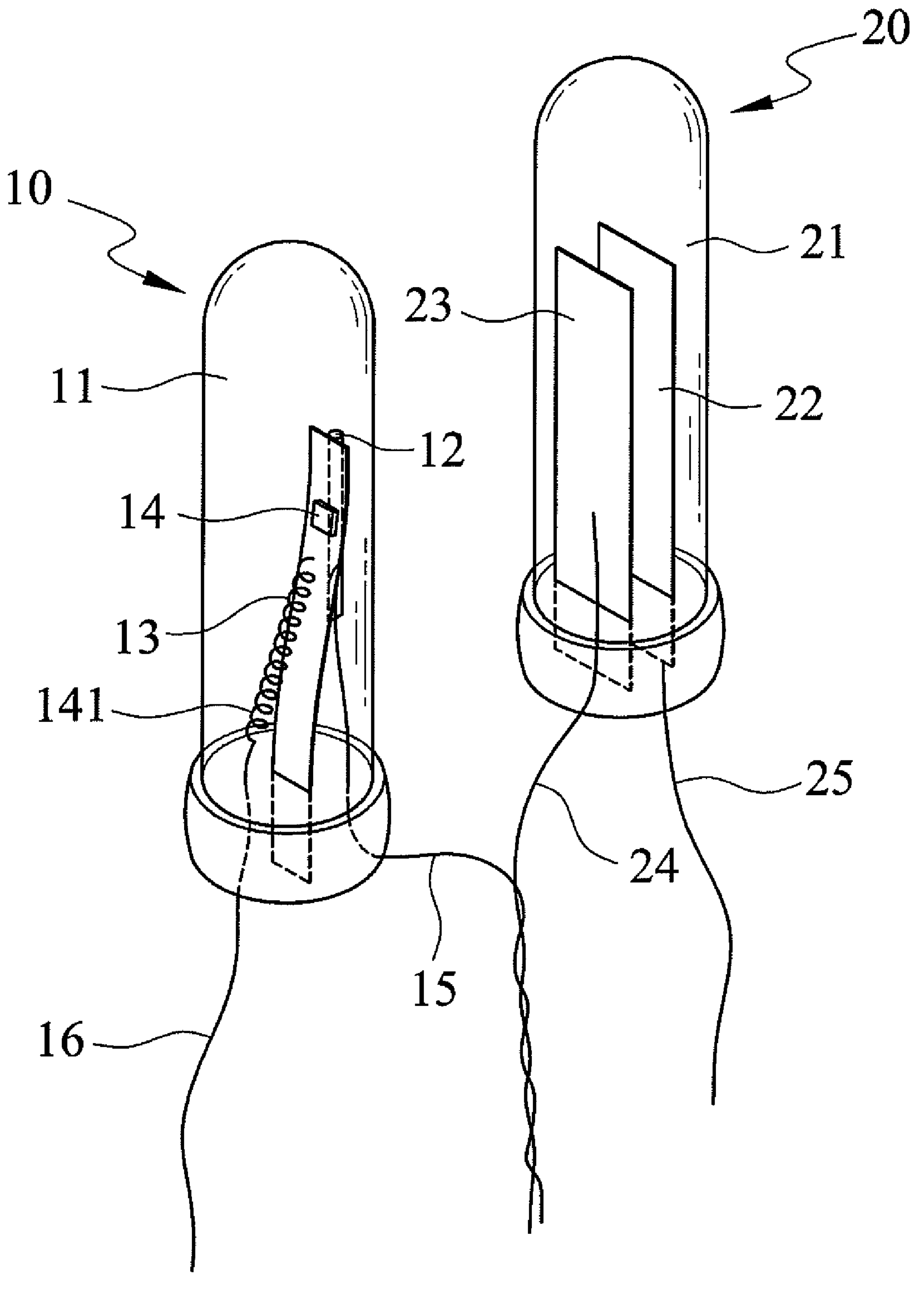
FIG. 1 is a perspective view showing the construction of the present invention.

Regarding to FIG. 1, the protector for instant driving a circuit of an electric device of present invention comprises; a driving device 10 and a voltage stabilizing device 20, wherein said driving device 10 has a sealed tube 11, for example, a glass tube. Two spring plates 12, 13 which are normally contacted with each other are installed inside said sealed tube 11. One spring plate 13 is provided with a semiconductor chip 14 having a function of sensing and limiting the electric current according to the requirements of different driving circuits used by people, on its one side. The spring plate 13 is connected to an electric resistant wire 141, such that when the switch of the power source is turned on and the electric current flows into the voltage stabilizing device, the spring plate 13 having the semiconductor chip 14 on it is instantly separated from the spring plate 12 for a very short time and then goes back to make the two spring plates 12 and 13 be contacted together, so as to drive the electric device, such as a motor or fluorescent lamp etc., to be operated. The spring plates 12 and 13 are respectively connected to electric conductive wires 15 and 16 outside the sealed tube 11.

The voltage stabilizing device 20 is also constructed with a sealed tube 21 and two conductive plates 22, 23 installed inside. The sealed tube 21 is preferably a glass tube filled with a special gas or gaseous composition, which is able to operate so that the two opposite and separated electric conductive plates 22 and 23 installed inside said sealed tube 21 electrically conduct with each other. The two conductive plates 22, 23 are installed in an atmosphere of the electrically operating gas. The two conductive plates 22, 23 are also respectively connected to the electric conductive wires 24 and 25 outside the sealed tube 21. One electric wire 24 of the voltage stabilizing device 20 is connected to one electric wire 15 of the driving device 10. Therefore the driving device 10 is serially connected to the voltage stabilizing device 20.

Referring again to FIG. 1 and FIG. 2, when the protector constructed with the driving device 10 and the voltage stabilizing device 20 is applied to a driving circuit 32 of an electric device 31, if the switch of the power source is turned on, a current of high voltage generated by the power source flows into the voltage stabilizing device 20. By the function of the gas or gaseous composition filled inside the sealed tube 21, the two conductive plates 22, 23 then become conductive with each other, and the current thus flows into the driving device 10. The spring plate 13 having a semiconductor chip 14 having the function of sensing and limiting the current on it is then operated to instantly separate from the spring plate 12 for a very short time and then return back to contact again with the spring plate 12, and the electric device 31 is then activated. Meanwhile, the electric resistant wire 141 of the driving device 10 consumes the electric energy generated by the extra surge current produced by the electric source. As a result, by using the electric resistant wire 141 to consume the electric energy generated by the extra surge current produced by the electric source, the surge current is prevented from flowing into the electric device 31, and damage to the electric device due to the surge current is avoided.

EXAMPLE

Figure 2:
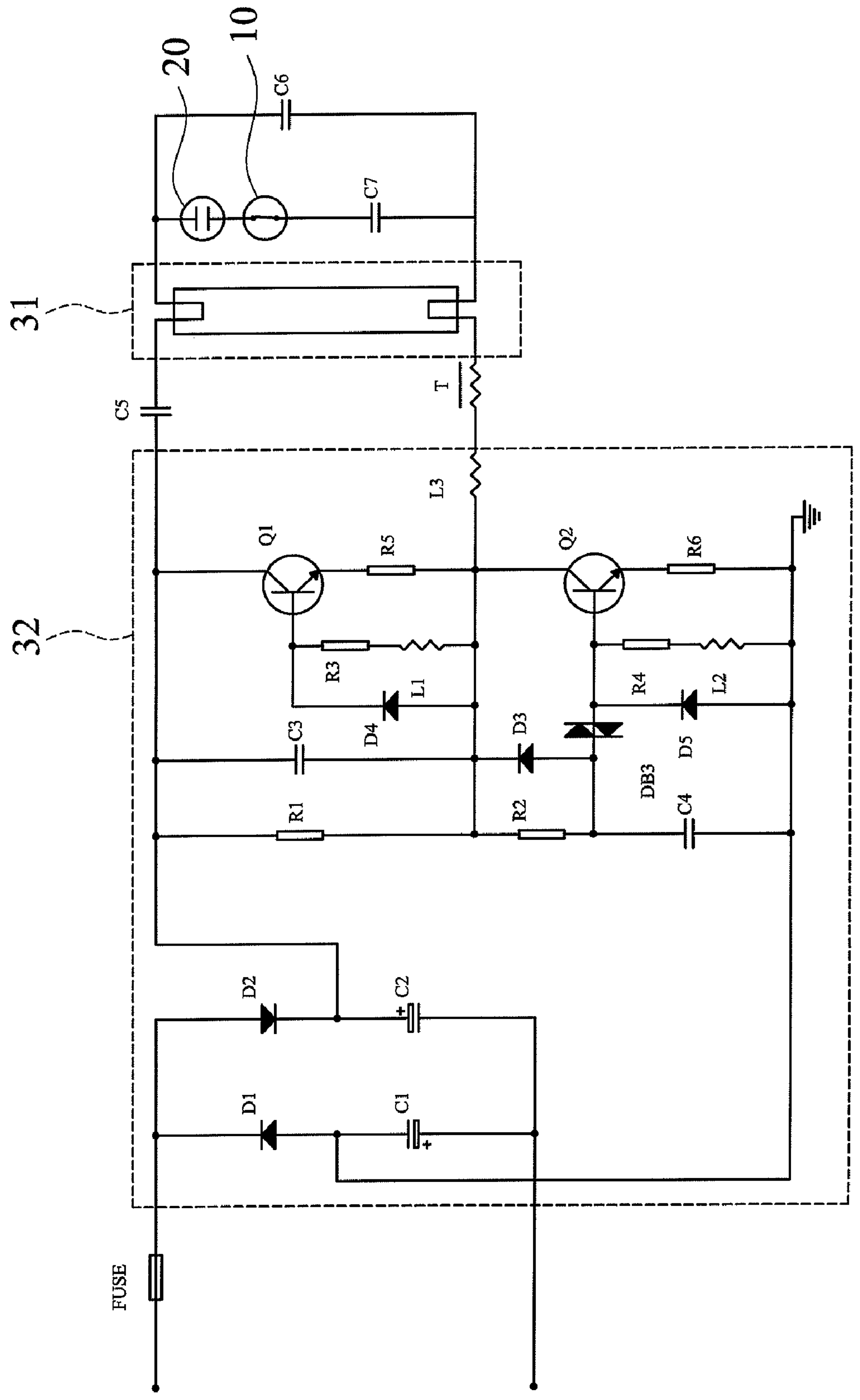
FIG. 2 is a schematic view showing an application of the present invention.

As shown in FIG. 1 and FIG. 2, the protector for an instant driving circuit of an electric device of the present invention can be utilized in a circuit for activating a fluorescent lamp, wherein, the serially connected driving device 10 and the voltage stabilizing device 20 are connected to the fluorescent lamp 31 and the voltage stabilizing circuit 32. When the switch of the power source is turned on, the current of high voltage for instantly activating the fluorescent lamp 31 flows into the voltage stabilizing device 20, and due to the function of the gas or gaseous composition filled in the sealed tube 21, the two conductive plates 22, 23 are conducted and a current of high voltage flows into the driving device 10. Thus the spring plate 13 having a semiconductor chip 14 having the function of sensing and limiting the current installed on it, is operated to separate from said spring plate 12 for a very short time, and then return back to contact again with the spring plate 12 instantly, and the fluorescent lamp 31 is then lighted. Afterwards, the electric resistant wire 141 consumes the electric energy generated by the extra surge current produced by the electric source. Thus the surge current is prevented from flowing into the fluorescent lamp 31 and voltage stabilizing circuit 32. As a result, damage to the fluorescent lamp 31 and its voltage stabilizing circuit 32 is avoided.

In conclusion from the above, the construction of the protector for an instant driving circuit of an electric device of present invention has never been seen in any publication or prior art, and it is deemed to be a new invention without any doubt. In addition, the function of the present invention is not covered by the conventional skills, and it is novel in comparison with conventional skills. It therefore complies with conditions for approvable of a patent.

In the drawings and specification, there have been disclosed typical preferred embodiments of the invention and, although specific terms are employed, they are used in a generic and descriptive sense only and not for purposes of limitation, the scope of the invention being set forth in the following claims.

I claim:

1. A protector for providing protection against instantaneous current for a driving circuit of an electric device comprising a driving device and a voltage stabilizing device, wherein, such driving device has a sealed tube installed with two spring plates normally contacting each other, wherein one spring plate is provided with a semiconductor chip on one side and is connected to an electric resistant wire, and said two spring plates are connected respectively to electric conductive wires outside the sealed tube; said voltage stabilizing device also has a sealed tube filled with a gas or gaseous composition and is installed with two conductive plates opposite to each other, and said two conductive plates are respectively connected to electric conductive wires outside the sealed tube, and wherein one electric conductive wire of said driving device is connected to that of the voltage stabilizing device, such that the driving device is serially connected to the voltage stabilizing device; and when the protector is connected to a driving circuit of an electric device, after the switch of a power source is turned on, a current of high voltage of the power source flows into the voltage stabilizing device, and the two conductive plates installed inside the sealed tube of said voltage stabilizing device are electrically conducted due to the function of the gas filled in the sealed tube of said voltage stabilizing device, and the current flows into said driving device, and said spring plate having the semiconductor chip is then instantly separated from the other spring plate for a very short time and then returns back to contact together with said another spring plate, so as to trigger the electric device(s), and meanwhile, the extra current of the power source is consumed in said electric resistant wire, such that the surge current instantly generated from the power source is consumed, and damage to the electric device due to the surge current is prevented.

2. The protector for providing protection against instantaneous current for a driving circuit of an electric device as claimed in claim 1, wherein the sealed tube of said driving device is a glass tube.

3. The protector for providing protection against instantaneous current for a driving circuit of an electric device as claimed in claim 1, wherein the sealed tube of said voltage stabilizing device is a glass tube.

4. The protector for providing protection against instantaneous current for a driving circuit of an electric device as claimed in claim 1, wherein said electric device is a motor or a fluorescent lamp.

5. The protector for providing protection against instantaneous current for a driving circuit of an electric device as claimed in claim 1, wherein said gas or gaseous composition is able to operate so that two of said opposite and separated electric conductive plates installed inside said sealed tube electrically conduct with each other.

* * * * *